United States Patent [19]

Muchalov

[11] Patent Number: 5,992,615
[45] Date of Patent: Nov. 30, 1999

[54] CURVED CONVEYOR SECTION

[76] Inventor: Ivan Muchalov, R.R. #1, Erin, Ontario, Canada, NOB 1TO

[21] Appl. No.: 09/005,798

[22] Filed: Jan. 12, 1998

[51] Int. Cl.$^6$ .............................. B65G 15/02; B65G 23/16
[52] U.S. Cl. ........................................... 198/831; 198/833
[58] Field of Search .................................... 198/831, 833

[56] References Cited

U.S. PATENT DOCUMENTS

| | | | |
|---|---|---|---|
| 3,270,863 | 9/1966 | Ackles ..................................... | 198/833 |
| 3,561,587 | 2/1971 | Schausten ............................... | 198/831 |
| 3,838,767 | 10/1974 | Taylor ..................................... | 198/831 |
| 3,912,072 | 10/1975 | Kornylak ................................ | 198/183 |
| 4,250,989 | 2/1981 | Gründken et al. ..................... | 198/729 |
| 4,488,639 | 12/1984 | Vogt et al. ............................... | 198/787 |
| 4,846,338 | 7/1989 | Widmer ................................... | 198/831 |
| 4,930,617 | 6/1990 | Lavoie et al. .......................... | 198/692 |
| 5,372,248 | 12/1994 | Horton .................................... | 198/852 |
| 5,398,804 | 3/1995 | Ecker et al. ............................. | 198/619 |
| 5,454,467 | 10/1995 | Lago ....................................... | 198/831 |
| 5,857,559 | 8/1996 | Gianvito et al. ....................... | 198/831 |

FOREIGN PATENT DOCUMENTS 0 011 962  6/1980  European Pat. Off. .
0 134 598  3/1985  European Pat. Off. .

OTHER PUBLICATIONS

JanTec Incorporated Product Brochure Entitled "Belt Conveyor Power Turns"; undated.
Portee Flonaster Division Product Flyer Entitled "Our Product Line Begins . . . "; 1988.

*Primary Examiner*—William E. Terrell
*Assistant Examiner*—Mark Deuble
*Attorney, Agent, or Firm*—Donald E. Hewson

[57] ABSTRACT

A curved conveyor section comprises a flat, horizontally disposed curved belt-supporting bed. Direction reversing members are disposed at each end of the conveyor section. A continuous loop curved conveyor belt has arcuate inner and outer edges with a common substantially vertical center axis, and is mounted on the belt-supporting bed. An article carrying portion of the conveyor section is disposed above the belt-supporting bed, and a return portion is disposed below the belt-supporting bed. A motor driven continuous loop drive chain or belt is oriented in a substantially horizontal plane and has a plurality of driving members disposed along its looped length. A plurality of driven receptors are securely mounted on the curved conveyor belt along its looped path. The driving members drivably engage a consecutive subset of the plurality of co-operating receptors. The driven receptors are a plurality of teeth, each of which is mounted to the curved conveyor belt by means of an elastomeric member. A driving force is imparted to the co-operating receptors by the driving members, thus causing selective movement of the curved conveyor belt along its looped path.

21 Claims, 10 Drawing Sheets

CURVED CONVEYOR SECTION

FIELD OF THE INVENTION

This invention relates to curved conveyor sections and more particularly to such curved conveyor sections driven by a drive chain or a drive belt, especially those having a conveyor belt of a small radius.

BACKGROUND OF THE INVENTION

In manufacturing processes, it is common to move goods along by means of conveyor systems having straight and curved sections. In many instances, it is desirable that the curved sections be of a small radius, such as to turn at almost a right angle in a confined space. Such curved conveyor sections typically have a continuous loop conveyor belts or may have an articulated linked conveyor belt.

Typically, such curved conveyor belts are driven through the use of a linked drive chain, a linkless drive chain, or a drive belt, each of which has a looped length and is typically driven by an electric motor. The most common way to drive a curved conveyor belt is through the use of a linked drive chain. For the sake of simplicity and clarity, only a linked drive chain will be referred to in this background section. The drive chain is in the form of a continuous loop, as is the conveyor belt, and is disposed at the outer edge of the conveyor belt or along the middle of the conveyor belt and directly drives the conveyor belt.

In order to facilitate proper meshing of the drive chain and conveyor belt, the drive chain must follow the path of the conveyor belt so as to keep the drive chain at the same speed as the conveyor at all points along the conveyor. Accordingly, the loop of the drive chain is essentially oriented similarly to the loop of the conveyor belt. In other words, since the conveyor belt is oriented substantially horizontally, the rollers at the ends of the conveyor belt are also oriented substantially horizontally. In order for the drive chain to follow the path of the conveyor belt, the axes of the links of the drive chain and the end roller's drive sprockets, which are engaged by the drive chain, must both be oriented substantially horizontally. In this manner, the drive chain can articulate vertically around the drive sprockets.

However, in order for a drive chain to follow the same curved path as a curved conveyor belt, it must also bend horizontally along its length, transversely to its usual direction of articulation between adjacent links. Conventional chains cannot bend significantly in a direction transverse to their normal direction of articulation between adjacent links, simply due to their construction. The minimum radius that a conventional chain can bend to in such a transverse direction is perhaps about ten feet, which is far too large a radius to be used in many curved conveyors. Further, a conventional drive chain is severely stressed by such transverse bending. Special flexible drive chains that can bend transversely to their normal direction of articulation may be used, but they are more expensive than conventional chains and still have a limited radius of curvature of perhaps four to five feet, which is larger than is often required as some conveyor bends must be quite sharp, perhaps with an outside radius of about two to three feet.

Another important consideration, irrespective of what type of drive chain is used, is that the drive sprocket on the rollers of the conveyor belt must have the same pitch diameter as the diameter of the rollers on the conveyor belt in order to provide for speed matching of the drive chain and conveyor belt. Such drive sprockets typically have a minimum pitch diameter of about three inches, more or less, as dictated by the drive chain. Accordingly, the minimum diameter of the end roller of a curved conveyor belt is also about three inches, more or less. An end roller having a three inch diameter would cause a significant cleft at the end of the curved conveyor, where the curved conveyor meets another conveyor. It is highly desirable to minimize such clefts in order to facilitate the smooth transfer of articles, especially readily damageable articles, from the curved conveyor to the next conveyor. It is therefore preferable to have the end rollers of a curved conveyor as small a diameter as possible, perhaps about one-half inch, or even less, which cannot be accomplished by presently known curved conveyors driven by drive chains unless an auxiliary end roller is also used.

Another manner of driving a curved conveyor belt, specifically a continuous and unbroken type curved conveyor belt, which overcomes some of the problems encountered with a drive chain arrangement, is to drive one or both of the two end rollers that the conveyor belt is looped around, typically by means of an electric motor. This manner of driving a curved conveyor belt also has significant disadvantages associated with it. The conveyor belt must be in tension in order to permit the driving force from the end roller or end rollers to be frictionally transmitted to the curved conveyor belt. In order to have the curved conveyor belt uniformly in tension and the curved conveyor belt must therefore be manufactured to very close tolerances, which is difficult and expensive, and therefore is undesirable. Moreover, such curved conveyor belts stretch and therefore require frequent adjustment or replacement. Further, it is difficult to transport heavy loads using this type of drive mechanism as it requires frictional engagement of the end roller or end rollers with the curved conveyor belt. Also, where articles such as food products are being conveyed, oils tend to become deposited on the conveyor belt, thus potentially causing reduced friction between the drive roller or drive rollers and the conveyor belt.

Another method of driving a curved conveyor belt, specifically a continuous and unbroken type curved conveyor belt, and which also overcomes some of the problems encountered with a drive chain arrangement, is to have a portion of the curved conveyor belt pinched between an external auxiliary drive roller and an opposed idler wheel that is spring biased against the drive wheel. This type of drive mechanism does not work well because the drive belt is driven at only one point along the belt. Again, where articles such as food products are being conveyed, oils tend to become deposited on the conveyor belt, thus potentially causing reduced friction between the external auxiliary drive roller and the conveyor belt.

It can therefore be seen that not using a drive chain arrangement to drive a curved conveyor belt is often unacceptable.

DESCRIPTION OF THE PRIOR ART

The closest known prior art to the present invention can be found in U.S. Pat. No. 4,846,338, issued Jul. 11, 1989, to WIDMER, which discloses a curved conveyor element comprising inner and outer curved frame members having first and second ends. A row of cylindrical rollers is disposed at each end of the conveyor. An endless conveyor belt is looped around the two rows of rollers and has an inner side edge and an outer side edge. The conveyor belt rests on a planar contact surface that is part of a ring member. Two guide rails are also fastened to the ring member, with an annular channel disposed in the outside surface of each guide rail. A continuous loop drive chain with the axes of its links oriented substantially horizontally is disposed in these two channels. The conveyor belt is interconnected to the chain by means of an elastic dog member and suitable other fastening elements. The drive chain must curve transversely to its designed direction of articulation, which is undesirable, and often unacceptable, for reasons as discussed above. Further, in order to minimize the radius of the end roller, an auxiliary cylindrical end roller must be used, which is also undesirable.

Another prior art patent that discloses a curved conveyor is U.S. Pat. No. 3,912,072, issued Oct. 14, 1975 to KORNYLAK, which discloses a radius chain conveyor having a drive chain with the axes of its links oriented substantially horizontally. As specifically discussed in the detailed description, ". . . a straight line portion of the chain may be transversely bent, as shown in FIG. 1, so that it will have a radius of, for example, nine feet", which is a completely unacceptable radius of curvature for most curved conveyors.

SUMMARY OF THE INVENTION

In accordance with one aspect of the present invention, there is provided a curved conveyor section comprising a generally flat substantially horizontally disposed curved belt-supporting bed having first and second opposite ends and first and second direction reversing members disposed at the first and second opposite ends, respectively. A continuous loop curved conveyor belt has arcuate inner and outer edges with a common substantially vertical centre axis and is mounted on the belt-supporting bed in looped relation around the direction reversing members so as to have an article carrying portion disposed above the belt-supporting bed and a return portion disposed below the belt-supporting bed, thus defining a looped path for the conveyor belt and presenting a substantially horizontal article carrying top surface. A continuous loop drive means is oriented in a substantially horizontal plane and has a plurality of driving members disposed along its looped length. A motor means drivably engages the continuous loop drive means. A plurality of driven receptors are securely mounted on the curved conveyor belt along its looped path. The driving members drivably engage a consecutive subset of the plurality of co-operating receptors, which consecutive subset is disposed at one of the article carrying portion and the return portion of the curved conveyor belt, so as to thereby impart a driving force to the co-operating receptors, thus causing selective movement of the continuous loop curved conveyor belt along its looped path.

BRIEF DESCRIPTION OF THE DRAWINGS

The novel features which are believed to be characteristic of the curved conveyor section present invention, as to its structure, organization, use and method of operation, together with further objectives and advantages thereof, will be better understood from the following drawings in which a presently preferred embodiment of the invention will now be illustrated by way of example. It is expressly understood, however, that the drawings are for the purpose of illustration and description only and are not intended as a definition of the limits of the invention. Embodiments of this invention will now be described by way of example in association with the accompanying drawings in which.

Figure 1:
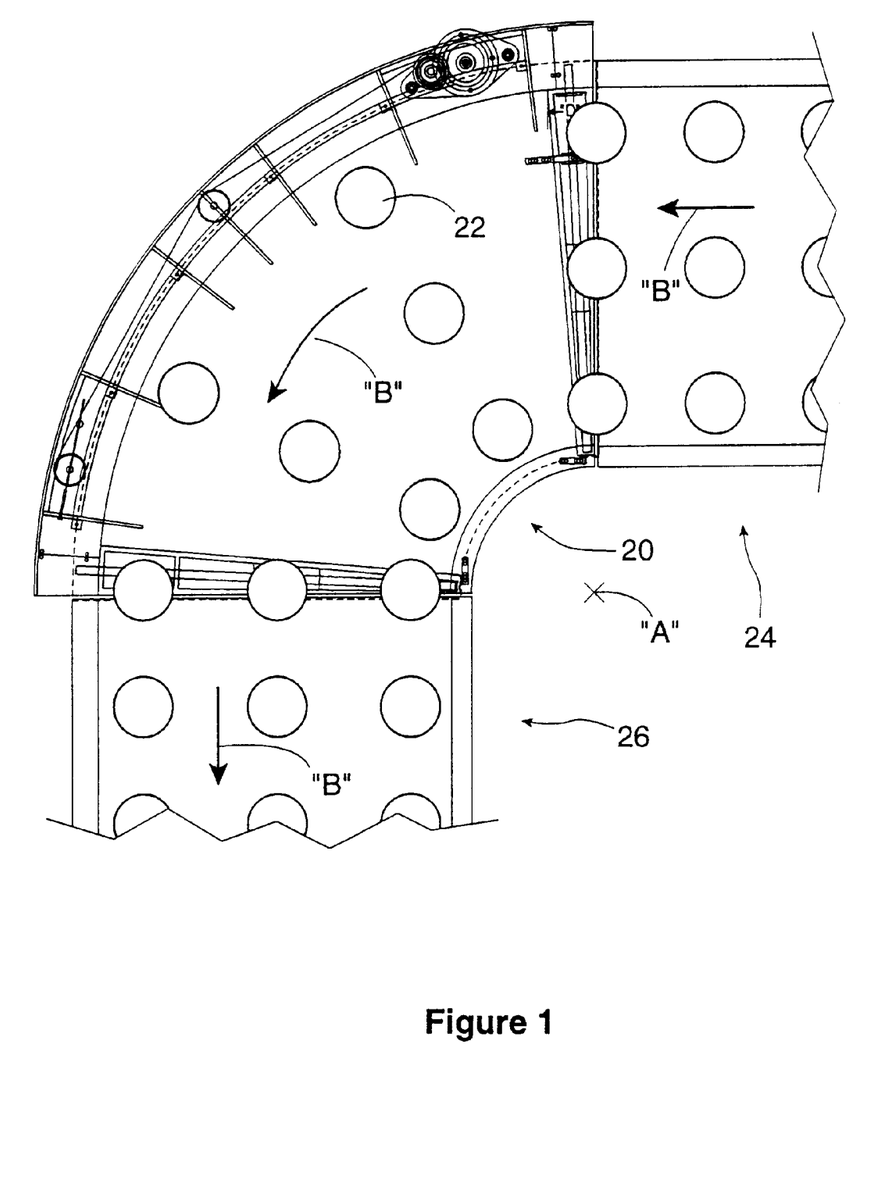
FIG. 1 is a top plan view of the curved conveyor section according to the present invention in use conveying articles from one straight conveyor to another straight conveyor.
Figure 2:
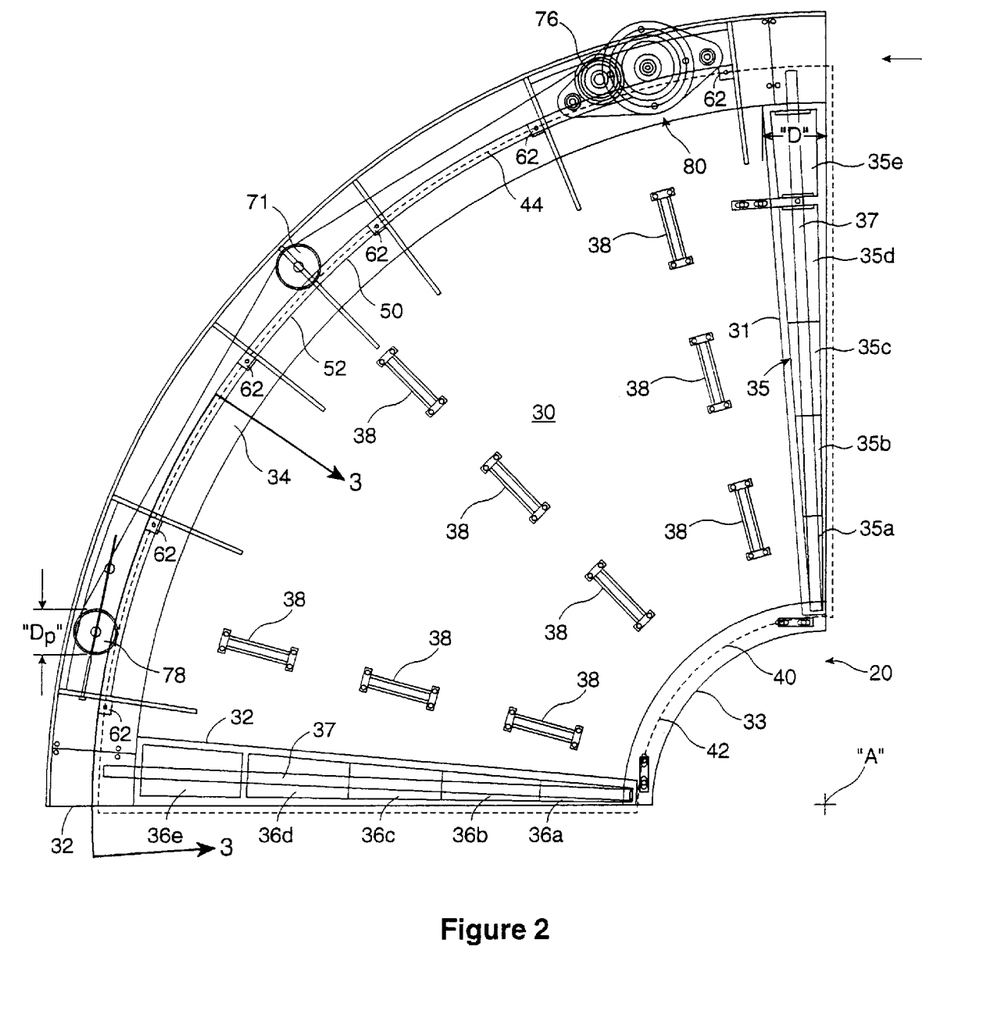
FIG. 2 is a top plan view of the curved conveyor section of FIG. 1 with parts removed or shown in ghost outline for the sake of clarity.

DETAILED DESCRIPTION OF THE PREFERRED EMBODIMENTS:

Reference will now be made to FIGS. 1 through 8, which show a preferred embodiment of the curved conveyor section 20 of the present invention, and to FIG. 9, which shows an alternative embodiment of the curved conveyor section 20 of the present invention. Referring first to FIG. 1, the curved conveyor section 20 is shown in use, transporting articles 22, from a first straight conveyor 24 to a second straight conveyor 26, as indicated by arrows "B". The articles may be food, such as muffins or the like, or may be one of many other type of manufactured articles. It can be seen in FIGS. 1 and 2 that the overall direction of travel of the articles 22 is changed by 90° in a small space by the preferred embodiment curved conveyor section 20. The degree of curvature of the curved conveyor section of the present invention is not limited to 90°, and may be, for instance, 30°, 45°, 60°, or virtually any other desired angle. Typically, the maximum degree of curvature necessary would be 180°. Also, curved conveyor sections may be abutted one to another to obtain desired degrees of curvature.

Reference will now be made to FIGS. 2 through 5, which show on an overall basis the working components of the curved conveyor section 20. The curved conveyor section 20 comprises a generally flat substantially horizontally disposed curved belt-supporting bed 30 having first and second opposite ends 31 and 32, respectively, and inner and outer edges 33 and 34, respectively. A first direction reversing member 35 is disposed at the first end 31 and similarly a second direction reversing member 36 is disposed at the second opposite end. Optional support rollers 38 are included to support the weight of heavy articles being conveyed by the curved conveyor section 20. The curved conveyor section 20 further comprises a continuous loop curved conveyor belt 40, which in the preferred embodiment is continuous and unbroken, but may also be of the segmented and articulated type, if desired. The continuous loop curved conveyor belt 40 is shown in FIG. 1 in solid lining and hidden lining as necessary, in FIGS. 3, 4, and 5 in solid lining, and in FIG. 2 in ghost outline for the sake of clarity.

The curved conveyor belt 40 has an arcuate inner edge 42 and an arcuate outer edge 44. The inner and outer edges 42, 44 have substantially vertical concentric centre axes "A" and are of substantially constant radius about the respective centre axis "A". The continuous loop curved conveyor belt 40 is mounted on the belt-supporting bed 30 in looped relation around the elongate roller members 35, 36 so as to have an article carrying portion 46 disposed above the belt-supporting bed 30 and moving in a direction as indicated by arrow "F", and a return portion 48 disposed below the belt-supporting bed 30 and moving in a direction as indicated by arrow "G", as can be best seen in FIG. 3. In this manner, a looped path for the conveyor belt 40 is defined and the conveyor belt 40 presents a substantially horizontal article carrying top surface 46t and has an opposite undersurface 46u.

In the preferred embodiment, each of the direction reversing members 35, 36 comprises a segmented elongate roller member having segments 35a through 35e and 36a through 36e, respectively, freely rotatably mounted on the belt-supporting bed 30 by means of an axle member 37 so as to be disposed substantially across the width of the conveyor belt 40. As can be readily appreciated, with the use of a curved conveyor belt 40, the linear speed at any point thereon will be directly proportional to the radius of that point from the axis "A". In other words, the linear speed of the curved conveyor belt 40 is not constant across its width. In order to accommodate such a continuum of speeds across the curved conveyor belt 40, the elongate roller members 35, 36 are correspondingly tapered with their smaller diameter disposed toward the inner edge 33 of the curved belt-supporting bed 30 and their smaller diameter disposed toward the outer edge 34 of the curved belt-supporting bed 30 so as to conform with the increasing radius of the continuous loop curved conveyor belt 40 from its inner edge 32 to its outer edge 44. Accordingly, the speed of the perimeter of the tapered elongate roller members 35, 36 matches the speed of the curved conveyor belt 40, thus precluding, or at least minimizing, sliding of the curved conveyor belt 40 on the tapered elongate roller members 35, 36. Also, segmenting of the tapered elongate roller members 35, 36 further precludes, or at least minimizes, sliding of the curved conveyor belt 40 on the tapered elongate roller members 35, 36; however, segmenting of the tapered elongate roller members 35, 36 is not necessary. It is also possible to use at each end of the curved conveyor belt 40 elongate roller members having a constant diameter, both segmented and non-segmented, as will be discussed subsequently with reference to FIG. 9.

In the preferred embodiment, a guide rail 50 is mounted on the belt-supporting bed 30 typically by means of threaded fasteners (not shown) and is disposed below the belt-supporting bed 30 in underlying relation thereto. The guide rail 50 extends substantially along the length of the belt-supporting bed 30, as can be best seen in FIG. 2, and has a convex arcuate tracking surface 52 with a centre axis "A" that is substantially coaxial with the centre axes "A" of the inner edge 42 and outer edge 44 of the conveyor belt 40. The convex arcuate tracking surface 52 on the guide rail 50 has a substantially constant radius about its centre axis "A".

A plurality of driven receptors comprising teeth 60 are securely mounted on the curved conveyor belt 40, as will be discussed in greater detail subsequently, along its looped path, in radially outwardly projecting relation from the common substantially vertical center axis "A", as can be best seen in FIG. 3. The teeth 60 are mounted on the curved conveyor belt 40 for driven engagement with the continuous loop drive means 70 operatively mounted on the curved conveyor section 20 so as to be oriented in a substantially horizontal plane, and in the preferred embodiment so as to be substantially coplanar with the article carrying portion 46 of the curved conveyor belt 40. The continuous loop drive means 70 has a plurality of driving members 72 disposed along its entire looped length, with the driving members 72 being regularly spaced apart one from the next by a pitch "P", as can be best seen in FIG. 3. The driving members 72 comprise co-operating void portions 73 for receiving the teeth 60 of the curved conveyor belt 40, and thereby drivably engage a consecutive subset of the plurality of co-operating receptors, namely the teeth 60 at either the article carrying portion 46 or the return portion 48 of the continuous looped curved conveyor belt 40 depending on the vertical placement of the continuous loop drive means 70. The teeth 60 along the remainder of the continuous looped curved conveyor belt 40 are not engaged until they reach the portion of the path where they become part of the engaged continuous subset of teeth 60. The driving members 72 thereby impart a driving force to the co-operating teeth 60, thus causing selective movement of the continuous loop curved conveyor belt 40 along its looped path.

In the preferred embodiment, the drive means 70 comprises a continuous loop drive chain 70 having a plurality of links 72 pivotally connected seriatim one to another by means of pins 74, with void portions 73 disposed between the links 72. The continuous loop drive chain 70 is oriented for pivotal movement of each link 72 with respect to adjacent links 72 about substantially vertically oriented axes "C", which axes "C" are generally centrally disposed through the pins 74. The drive chain 70 is operatively mounted on the curved conveyor section 20 around a drive sprocket 76 disposed adjacent the first end 31 of the curved belt-supporting bed 30 and a cooperating free-wheeling sprocket 78 disposed adjacent the second end 32 of the belt-supporting bed 30. The drive sprocket 76 and free-wheeling sprocket 78 typically each have the same pitch diameter "$D_P$" as the other, but not necessarily so. One advantage of the present invention is that the pitch diameter "$D_P$" of the sprockets 76, 78 does not need to be the same as the maximum diameter "$D_M$" of the elongate roller members 35, 36. The return portion of the continuous loop drive chain 70 is fed around idler sprocket 71 to keep it separated from the portion of the drive chain 70 that is engaging some of the teeth 60.

The continuous loop drive chain 70 drivably engages some of the plurality of teeth 60 disposed at the article carrying portion 46 of the curved conveyor belt 40, and is substantially co-planar with the article carrying portion 46 of the curved conveyor belt 40 so as to permit engagement of the plurality of teeth 60 with the links 72 of the drive chain 70. Alternatively, the continuous loop drive chain 70 may be disposed at the return portion 48 of the conveyor belt, and therefore would be substantially co-planar with the return portion 48. In any event, the plurality of teeth 60 are mounted on the curved conveyor belt 40 so as to be oriented and properly aligned with the openings of the links 72 of the continuous loop drive chain 70.

Figure 6:
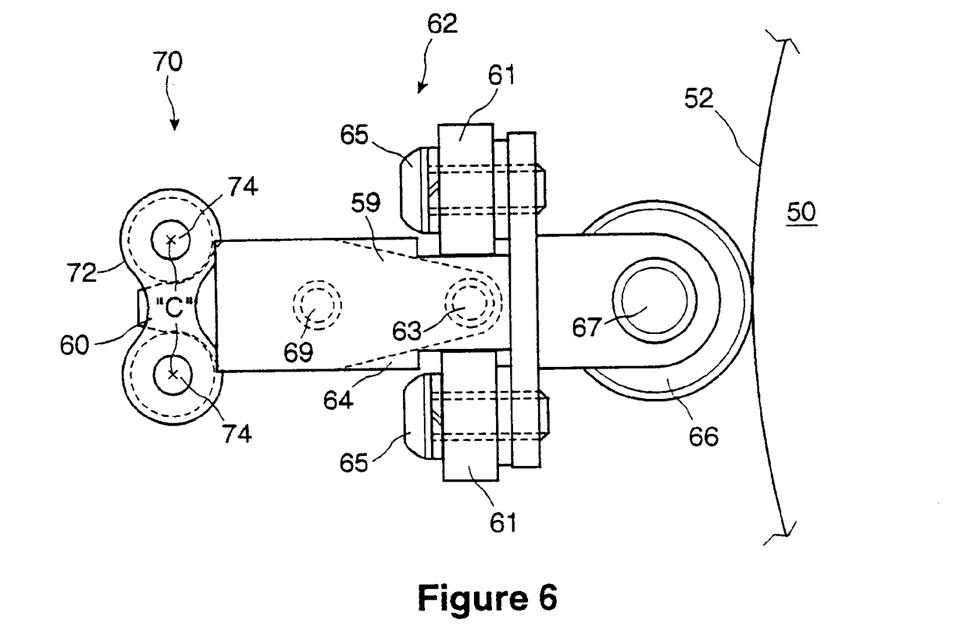
FIG. 6 is a top plan view of a tooth assembly used in the curved conveyor section of the present invention.
Figure 7:
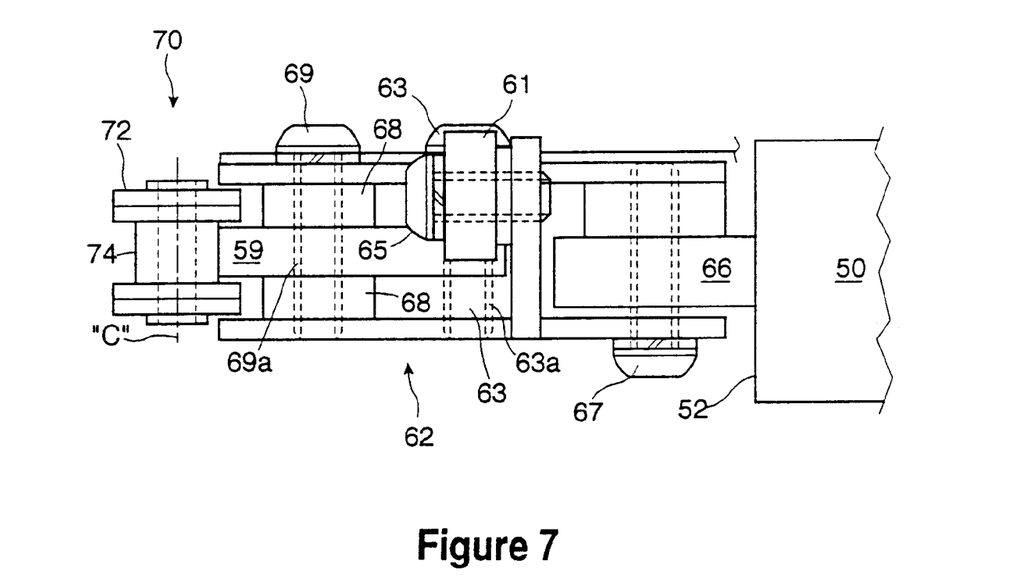
FIG. 7 is an end view of the tooth assembly of FIG. 6.
Figure 8:
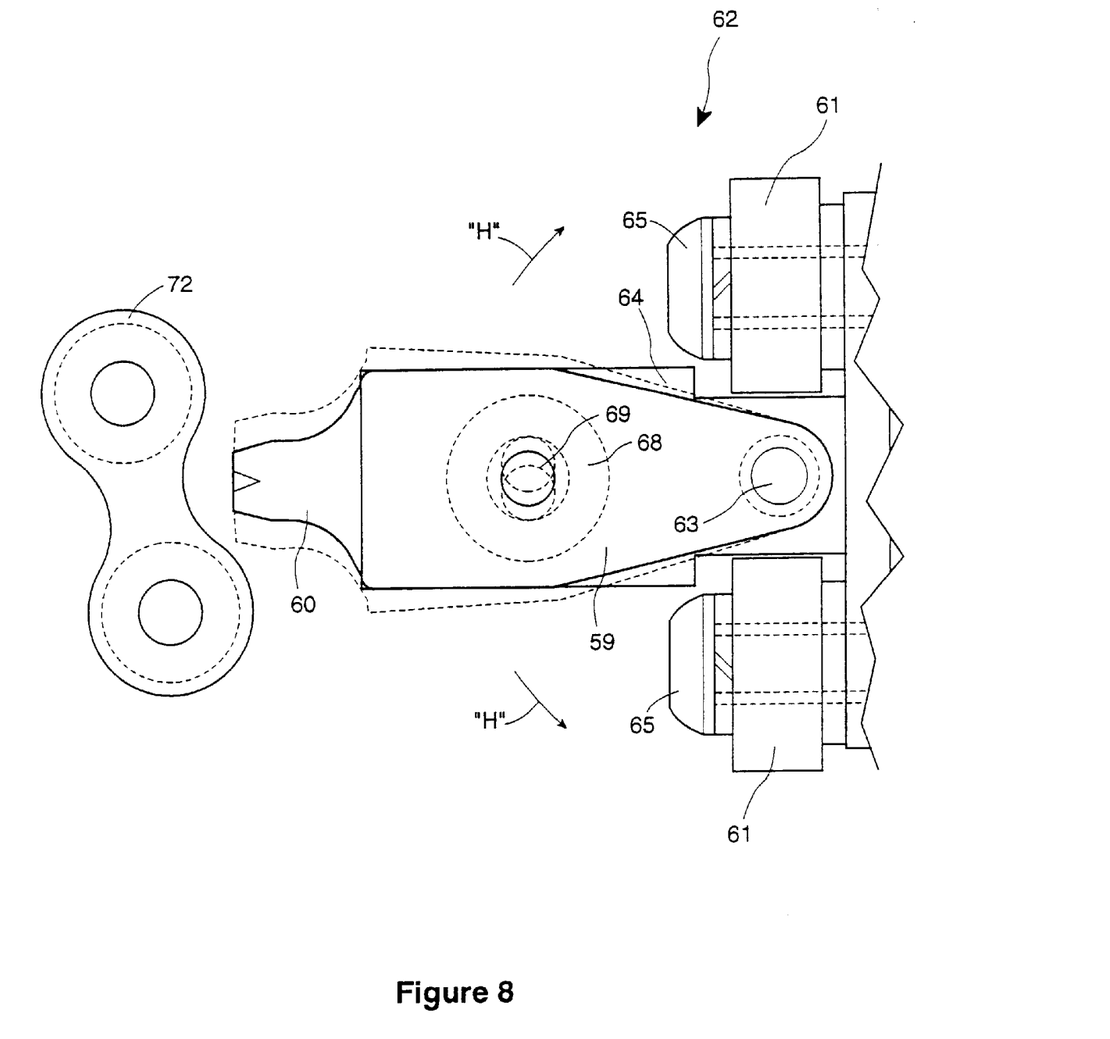
FIG. 8 is an enlarged top view of the tooth assembly of FIG. 6, showing deformation of the elastomeric element therein.

The plurality of teeth 60 are securely mounted on the curved conveyor belt 40 by means of mounting assemblies 62, as can be best seen in FIGS. 6 through 8. Each mounting assembly 62 includes a main body member 64 secured to the curved conveyor belt 40 by means of rivets (not shown). In the preferred embodiment, the mounting assemblies 62 are secured to the curved conveyor belt 40 at the arcuate outer edge 44 thereof, but may also be secured to the curved conveyor belt 40 between the arcuate inner edge 42 and the arcuate outer edge 44. In this event, the mounting assembly 62 are disposed at the undersurface 46u of the article carrying portion 46 of the curved conveyor belt 40 so as to not interfere with articles 22 being conveyed by the curved conveyor belt 40.

Each of the plurality of teeth 60 includes a mounting base 59 and is mounted on the respective mounting assembly 62 by means of a pin member 63 and a pin member 69 extending through co-operating apertures 63a, 69a in the mounting base 59. A substantially cylindrical elastomeric member 68 is operatively mounted in surrounding relation around the pin member 69, between the pin member 69 and the mounting base 59, which elastomeric member 68 causes the respective tooth 60 to be biased to a neutral center position.

Two roller bearing members 66 are each operatively mounted on the main body member 64 of the mounting assembly 62 by means of a respective pin member 67, for rolling contact with the convex arcuate tracking surface 52 on the guide rail 50. The teeth 60, or more specifically the roller bearing members 66, are in abutting relation against the tracking surface 52 of the guide rail 50, as can be best seen in FIGS. 6 and 7. In this manner, the teeth 60 are laterally supported during movement of the curved conveyor belt 40 along its looped path, and thus the teeth 60 remain engaged in the drive chain 70. Accordingly, the portion of the continuous loop drive chain 70 that engages some of the teeth 60 is also laterally supported by the tracking surface 52. The teeth 60 at the return portion 48 of the continuous loop curved conveyor belt 40 are supported on a support rail 39 by means of two roller bearing members 61 mounted to the main body member 64 by means of respective pin members 65.

It can be seen that in order for the teeth 60 to properly engage the drive chain 60, the plurality of teeth must be spaced apart one from the next by a distance that is an integer multiple of the pitch of the drive chain. The teeth 60 may be spaced apart so as to engage the space between each and every adjacent link 72, or instead, as in the preferred embodiment, may engage the space between every "Nth" adjacent link 72, where "N" is a positive integer greater than one. In that case, the plurality of teeth are spaced apart one from the next by a distance that is an integer multiple of the pitch of the drive chain 70, with the integer multiple being greater than one. Preferably, the integer multiple is from two to ten. Also, the spacing between the adjacent teeth 60 does not need to be constant and can vary, thus precluding the need for having a specific number of links in the drive chain 70.

In use, as the teeth 60 are about to enter the spaces between adjacent links 72 of the drive chain 70, as can be best seen in FIG. 8, the teeth 60 might or might not be precisely aligned with the respective space. In order to assist the teeth 60 to readily enter the spaces between adjacent links 72, the elastomeric member 68 permits a minor amount of rotation of the mounting base 59 about the pin member 63, as indicated by arrows "H". Such rotation of the mounting base 59 essentially translates to a minor amount of longitudinal displacement of the respective tooth 60, as indicated in dashed outline, in a direction along the length of the conveyor belt 40, both back and forth, when the teeth 60 are engaging the drive chain 70. Accordingly, if a tooth 60 is not properly aligned with the corresponding space between the adjacent links 72, the elastomeric member 68 permits the tooth 60 to align itself as the tooth tries to enter the space between adjacent links 72. Alternatively, the elastomeric member 68 may be replaced by one or more springs, or the like, in order to cause the tooth 60 to be biased to a neutral center position. Also, elastomeric member 68 may be replaced by a similarly shaped rigid member made from a material such as suitable plastic or metal, if longitudinal displacement of the tooth 60, as discussed above, is not required.

Figure 3:
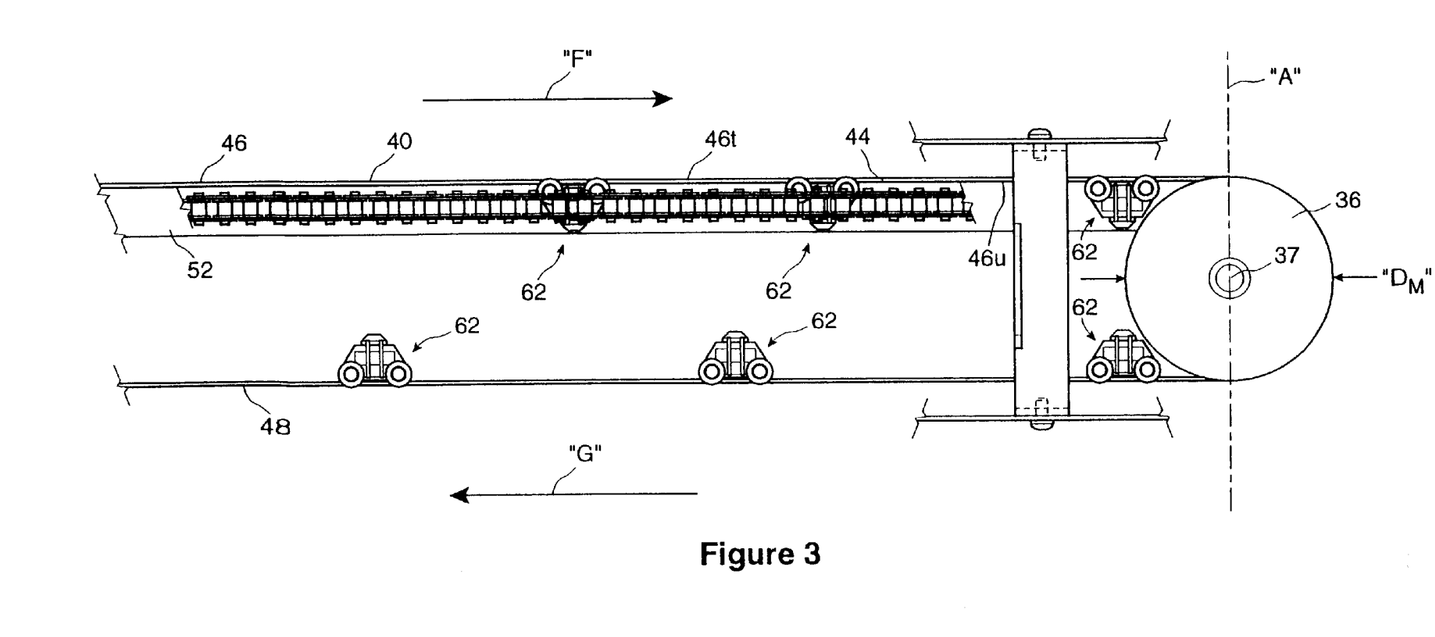
FIG. 3 is a sectional side elevational view of the curved conveyor section of FIG. 1, taken along section line 3—3 of FIG. 2.
Figure 4:
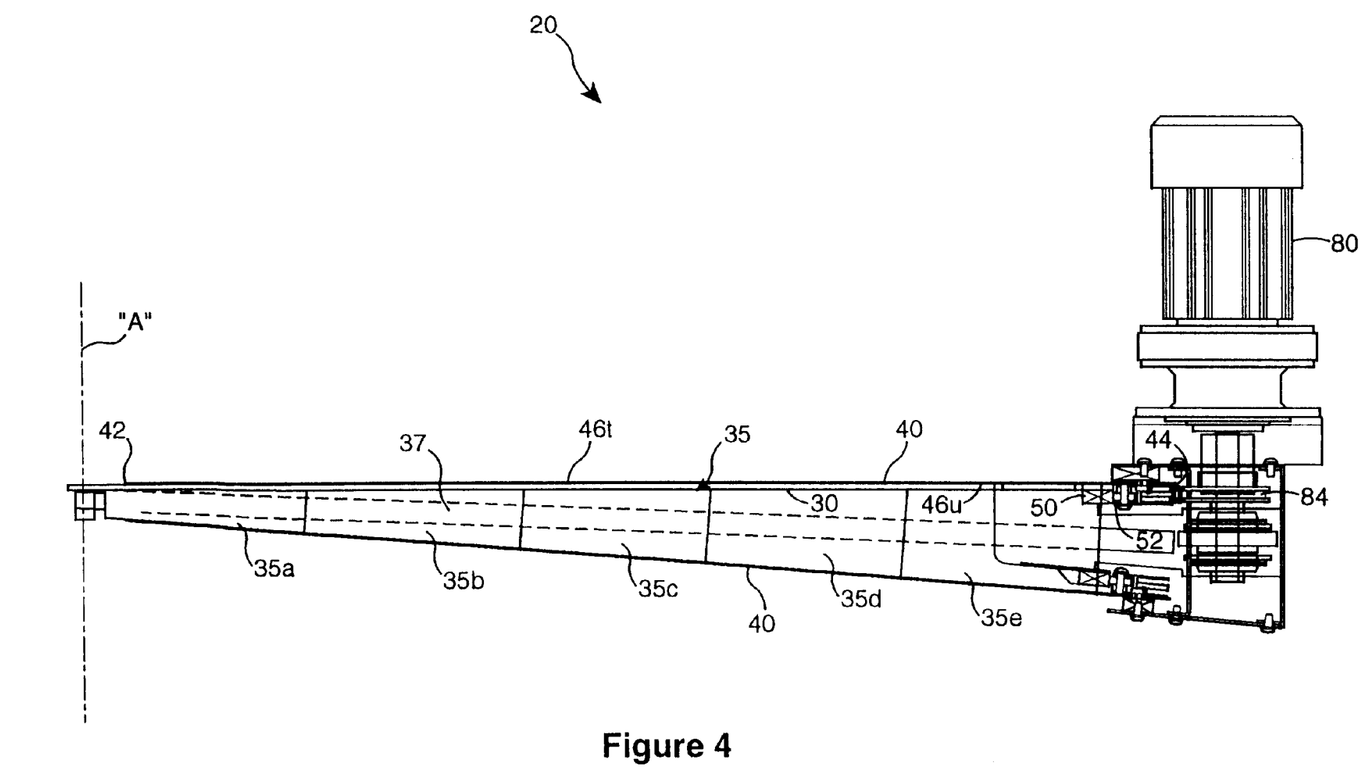
FIG. 4 is an end elevational view of the curved conveyor section of FIG. 1.
Figure 5:
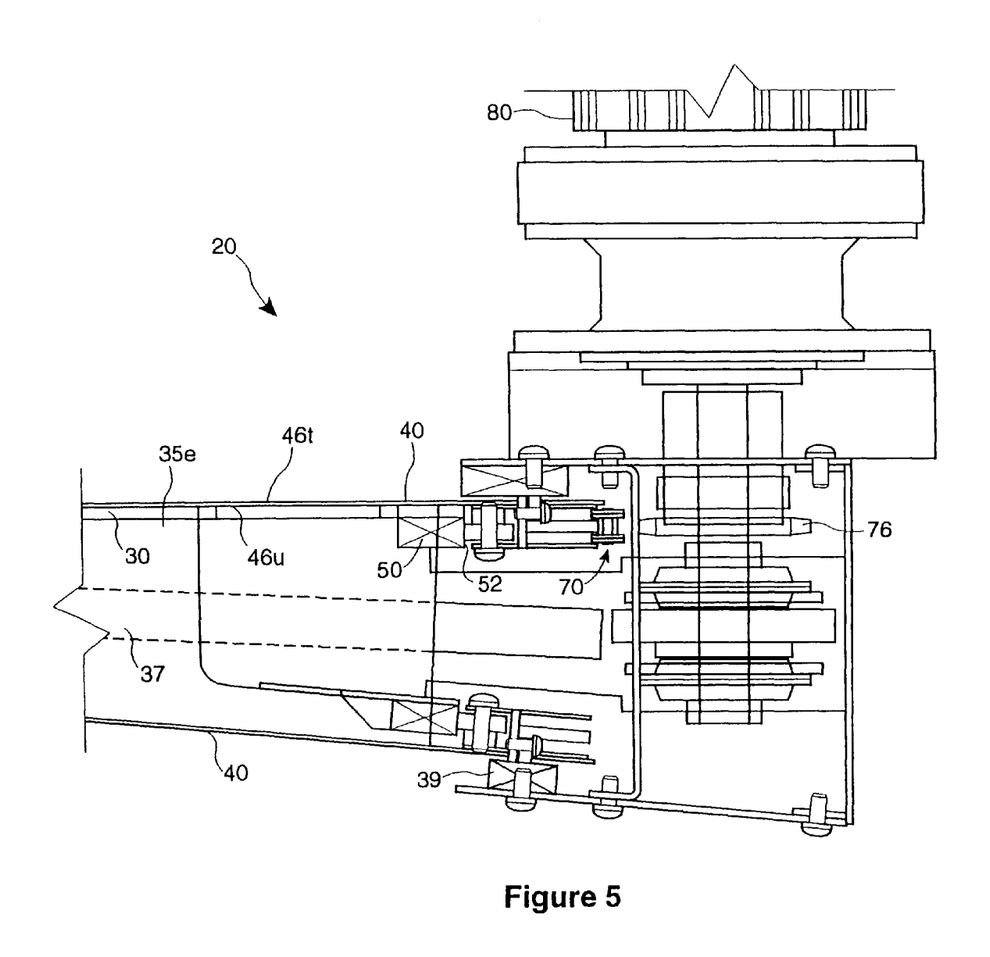
FIG. 5 is an enlarged end elevational view similar to FIG. 4, but showing a lesser portion of the curved conveyor section.

A motor means, preferably an electric motor 80, is securely mounted on the curved conveyor section 20 so as to rotatably drive the drive sprocket 76, thus drivably engaging the continuous loop drive chain 70, thereby imparting a driving force to the teeth 60, thus causing selective movement of the continuous loop curved conveyor belt 40 along its looped path, as is shown by arrows "E" in FIG. 3, thus permitting conveying of articles 22 as shown in FIG. 1 by arrows "B".

In the preferred embodiment, the curved conveyor section 20 further comprises a ramp member (not shown) securely mounted on the belt-supporting bed 30, which receives and positions the plurality of teeth 60 as they transition from the return portion 48 and approach the article carrying portion 46, so that the teeth 60 can properly engage the links 72 of the continuous loop drive chain 70.

It can be seen that the axis of rotation of the sprockets 76, 78 are substantially vertically oriented, as are the axes "C" of the links 72 of the continuous loop drive chain 70. In this manner, the drive chain may readily follow the curved path of the conveyor, specifically along the outer edge 44 of the curved conveyor belt 40, and not experience any transverse bending of the links 72 of the drive chain 70, which is impossible with the chain driven conveyors in the prior art.

Figure 9:
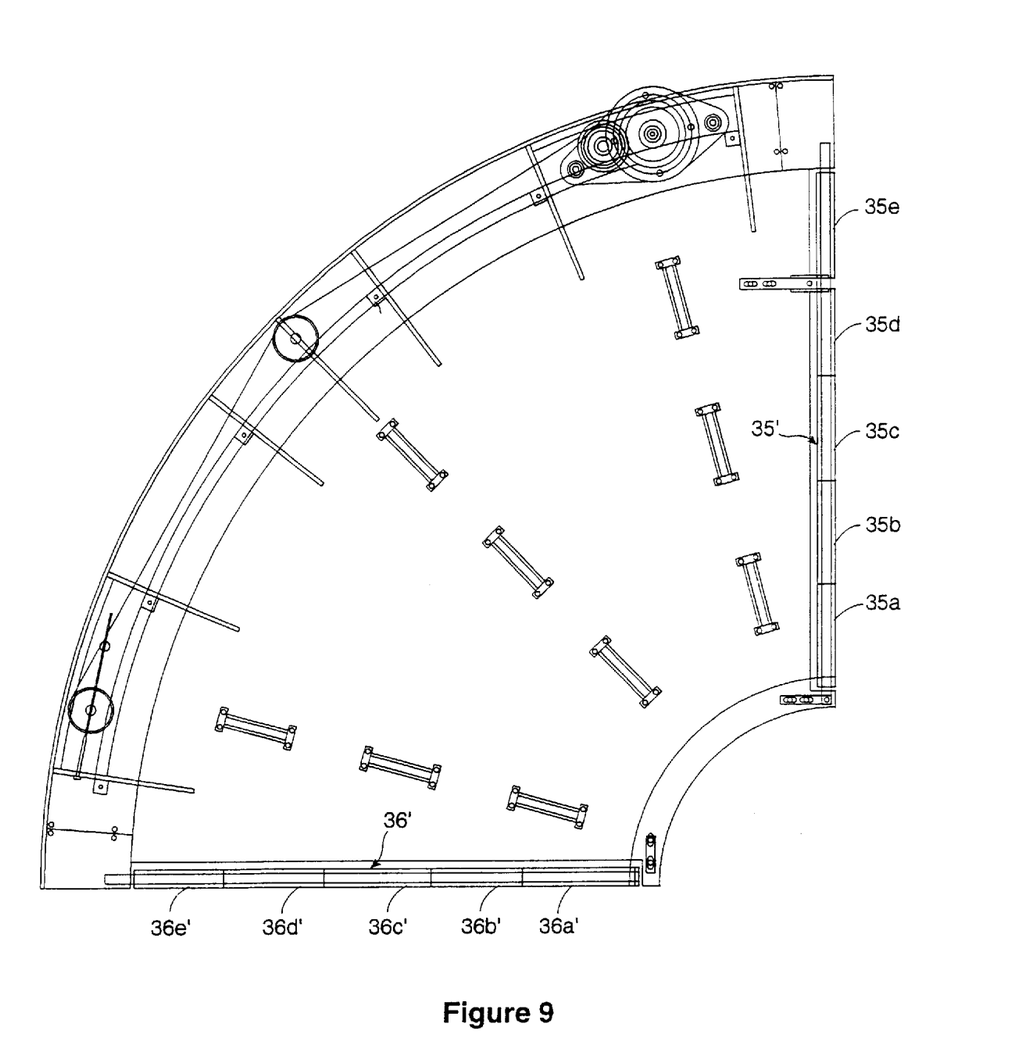
FIG. 9 is a top plan view of an alternative embodiment curved conveyor section of the present invention, with parts cut away for the sake of clarity.

In an alternative embodiment of the present invention, as illustrated in FIG. 9, each of the elongate roller members 35', 36' is of a substantially constant diameter along its length. If such substantially constant diameter elongate roller members 35', 36' are used, it is necessary for them to be longitudinally segmented, such as in five axially aligned segments 35a' through 35e' and 36a' through 36e'. Use of such segmented cylindrical elongate roller members 35a' through 36e' at least minimizes or lessens sliding of the curved conveyor belt 40 on the cylindrical elongate roller members 35', 36'.

Figure 10:
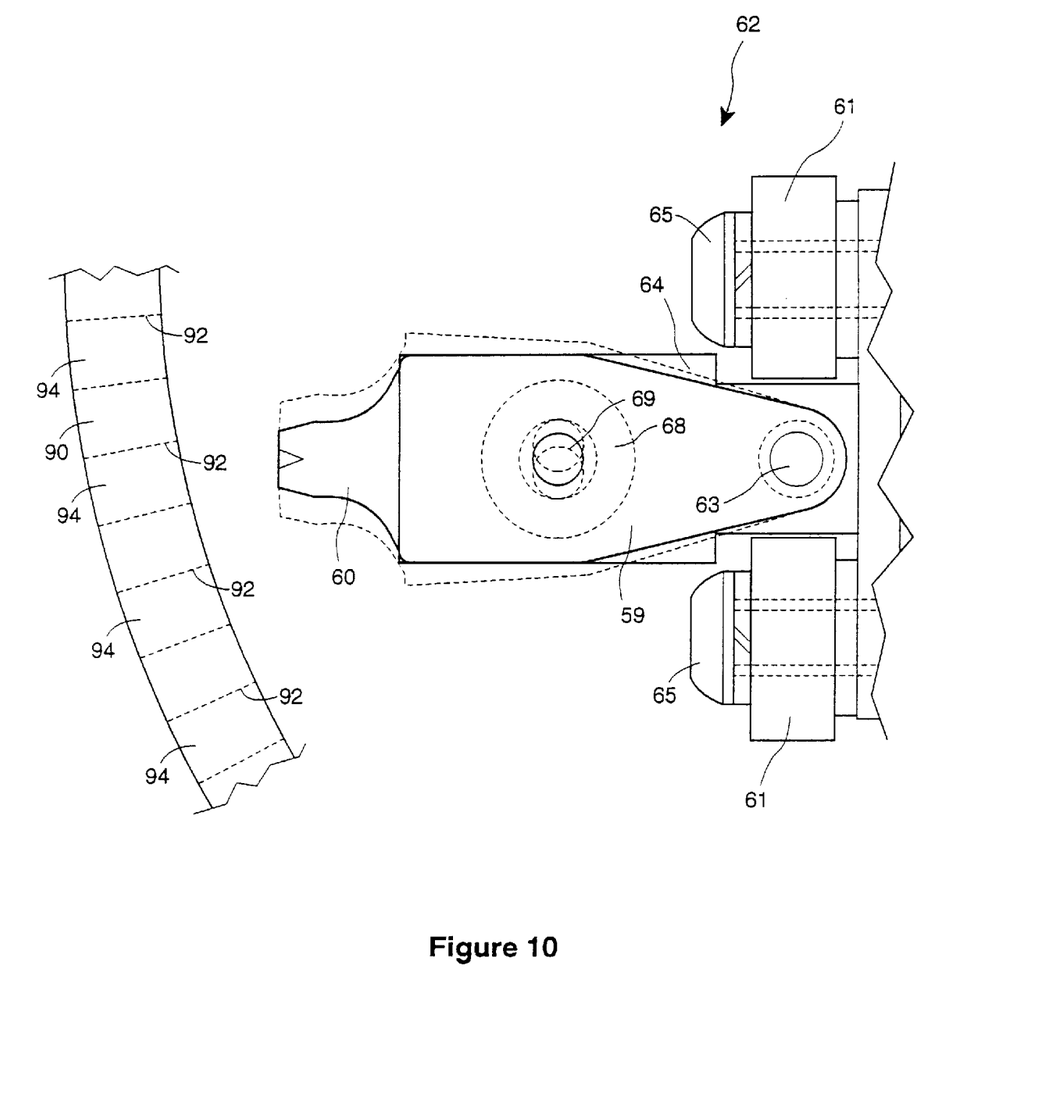
FIGS. 10, 11, and 12 are simplified top plan views of alternative embodiment curved conveyor sections of the present invention.

In another alternative embodiment of the present invention, as illustrated in FIG. 10, the continuous loop drive means comprises a drive belt 90 having drive members 92 and cooperating void portions 94 for receiving teeth 60 therein.

Figure 11:
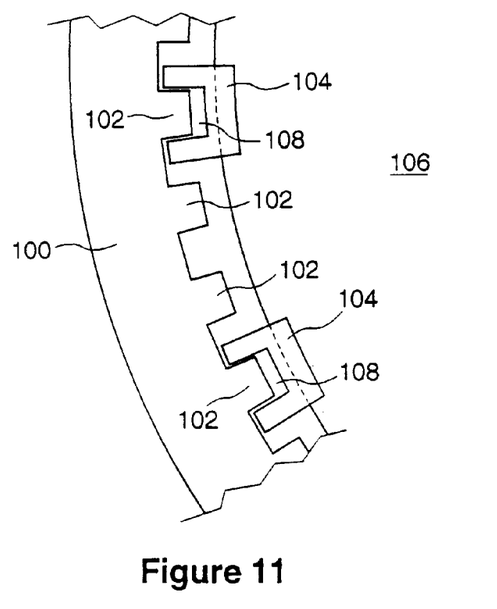

In yet another alternative embodiment of the present invention, as shown in FIG. 11, the continuous loop drive means comprises a drive belt 100. The driving members on the drive belt 100 comprises teeth 102 disposed along the looped length of the drive belt 100. Each the driven receptors 104 on the continuous loop curved conveyor belt 106 defines a cooperating void portion 108 for receiving the teeth 102 in driving relation therein.

Figure 12:
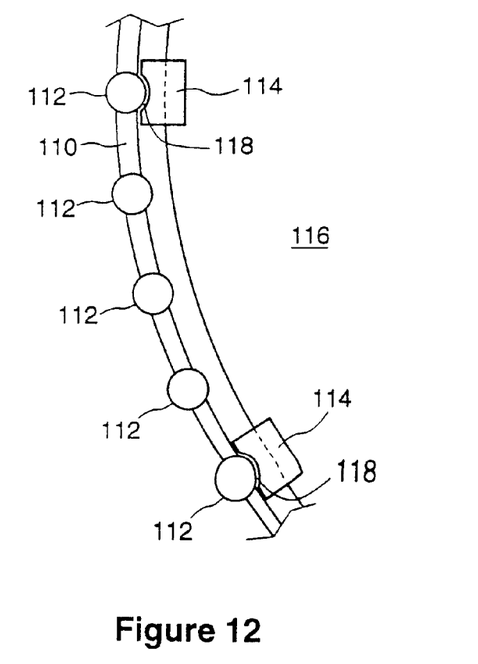

In another similar alternative embodiment of the present invention, as shown in FIG. 12, the continuous loop drive means comprises a linkless chain 110 having a plurality of protrusions 112 disposed along the looped length of the linkless chain 110. Each the driven receptors 114 on the continuous loop curved conveyor belt 116 defines a co-operating void portion 118 for receiving the protrusions 112 in driving relation therein.

In yet another alternative embodiment of the present invention (not shown), the two roller bearing members 66 are replaced by a low-friction plastic element that slides along the convex arcuate tracking surface 52, or may also be replaced by other types of low-friction plastic elements such as hangers that would engage a co-operating track.

Other modifications and alterations may be used in the design and manufacture of the apparatus of the present invention without departing from the spirit and scope of the accompanying claims.

What is claimed is:

1. A curved conveyor section comprising:
   a generally flat substantially horizontally disposed curved belt-supporting bed having first and second opposite ends and first and second direction reversing members disposed at said first and second opposite ends, respectively;
   a continuous loop curved conveyor belt having arcuate inner and outer edges with a common substantially vertical center axis, said continuous loop curved conveyor belt being mounted on said belt-supporting bed in looped relation around said direction reversing members so as to have an article portion disposed above said belt-supporting bed and a return portion disposed below said belt-supporting bed, thus defining a looped path for said conveyor belt and presenting a substantially horizontal article carrying top surface;
   a guide rail mounted on said belt-supporting bed and extending substantially along the length thereof, and having a convex arcuate tracking surface with a center axis substantially coaxial with said center axis of said inner and outer edges of said conveyor belt;
   a continuous loop drive means oriented in a substantially horizontal plane and having a plurality of driving members disposed along its looped length;
   motor means drivably engaging said continuous loop drive means; and
   a plurality of driven receptors securely mounted on said curved conveyor belt along its looped path, wherein said driven receptors comprise teeth and said driving members comprise co-operating void portions for receiving said teeth;
   wherein each of said driven receptors is securely retained by means of a respective mounting assembly secured to said curved conveyor belt;
   wherein each of said teeth is mounted by means of an elastomeric member securely retained by the respective mounting assembly, so as to pet minor longitudinal displacement of said teeth with respect to said conveyor belt when engaging said drive chain; and
   wherein said plurality of driving members drivably engage a consecutive subset of said plurality of co-operating receptors, which consecutive subset is disposed at one of said article carrying portion and said return portion of said curved conveyor belt, so as to thereby impart a driving force to said co-operating receptors, thus causing selective movement of said continuous loop curved conveyor belt along its looped path.

2. The curved conveyor section of claim 1, wherein said driving members are regularly spaced apart one from the next by a pitch "P".

3. The curved conveyor section of claim 2, wherein said driving members comprise teeth and each said driven receptors defines a co-operating void portion for receiving said teeth.

4. The curved conveyor section of claim 3, wherein said continuous loop drive means is chosen from the group consisting of a belt and a linkless chain.

5. The curved conveyor section of claim 2, wherein said driven receptors are spaced apart one from the next by a distance that is an integer multiple of the pitch of said driving members of said continuous loop drive means, and wherein said integer multiple is greater than one.

6. The curved conveyor section of claim 5, wherein said integer multiple is from two to ten.

7. The curved conveyor section of claim 1, wherein said teeth are mounted on said conveyor belt in radially outwardly projecting relation from said common substantially vertical centre axis and in abutting relation against said tracking surface of said guide rail, wherein said teeth are laterally supported during movement of said conveyor belt along its looped path.

8. The curved conveyor section of claim 7, wherein said continuous loop drive means is chosen from the group consisting of a belt and a chain.

9. The curved conveyor section of claim 8, wherein said drive chain comprises a plurality of links pivotally connected seriatim one to another and oriented for pivotal movement of each said link with respect to adjacent links about substantially vertically oriented axes.

10. The curved conveyor section of claim 1, wherein said continuous loop drive means drivably engages said driven receptors at said article carrying portion of said curved conveyor belt.

11. The curved conveyor section of claim 10, wherein said continuous loop drive means is substantially co-planar with the article carrying portion of said curved conveyor belt.

12. The curved conveyor section of claim 1, wherein each of said direction reversing members comprises an elongate roller member rotatably mounted on said belt-supporting bed and disposed substantially across the width of said conveyor belt.

13. The curved conveyor section of claim 12, wherein each of said elongate roller members is freely rotatably mounted.

14. The curved conveyor section of claim 12, wherein each of said elongate roller members is of substantially constant diameter along its length.

15. The curved conveyor section of claim 12, wherein of each said elongate roller members is tapered along its length.

16. The curved conveyor section of claim 1, wherein said convex arcuate tracking surface on said guide tail is of substantially constant radius about its centre axis.

17. The curved conveyor section of claim 1, wherein said guide rail is disposed below said belt-supporting bed in underlying relation thereto.

18. The curved conveyor section of claim 1, wherein said curved belt-supporting bed further includes a plurality of conveyor belt supporting rollers.

19. The curved conveyor section of claim 1, wherein each said mounting assembly includes a roller bearing member operatively mounted on said mounting assembly for rolling contact with said convex arcuate tracking surface on said guide rail.

20. The curved conveyor section of claim 1, wherein said mounting assemblies are secured to said curved conveyor belt at said outer edge thereof.

21. The curved conveyor section of claim 1, wherein each said elastomeric member is substantially cylindrical and has a generally centrally disposed substantially cylindrical pin receiving aperture therein.

* * * * *